Patented Feb. 4, 1947

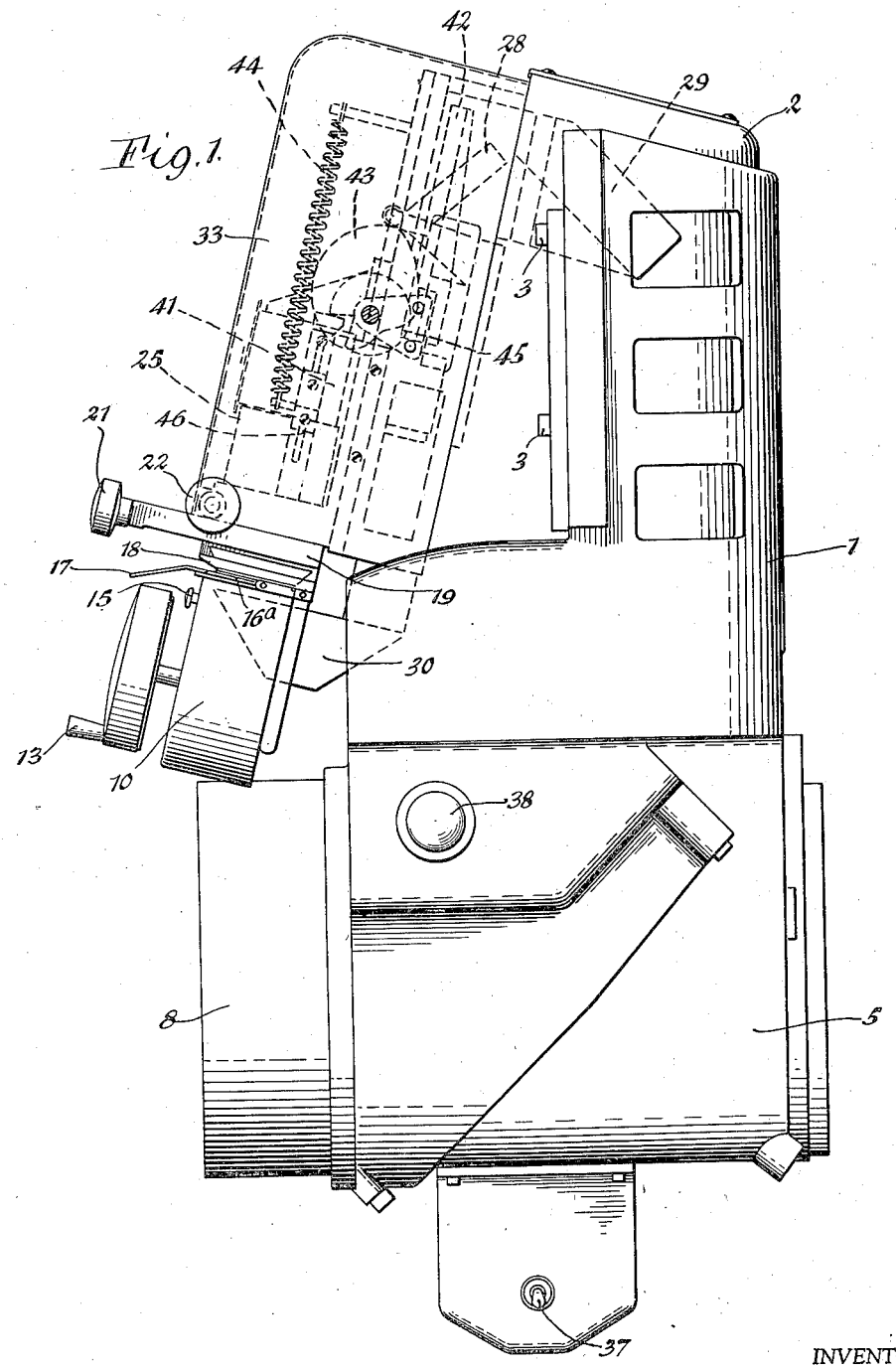

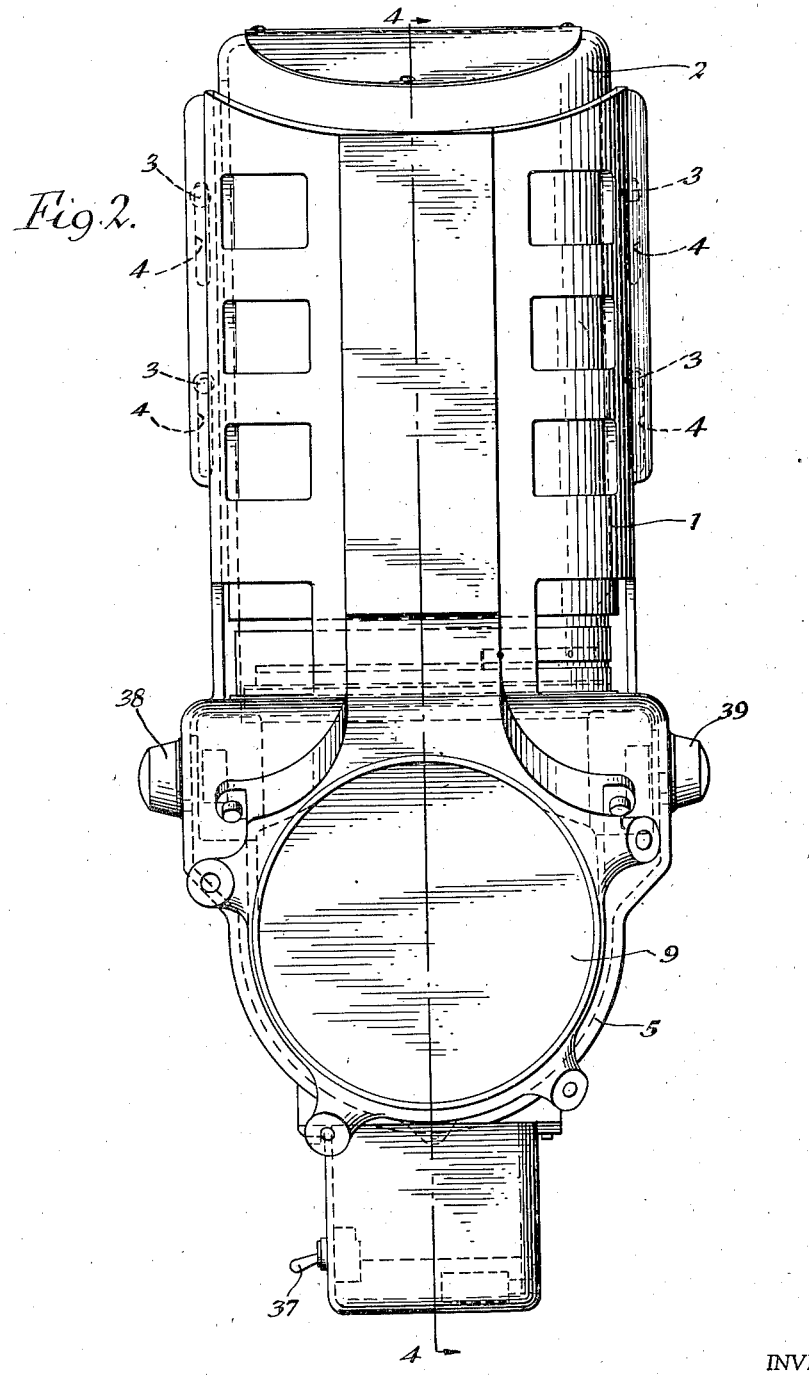

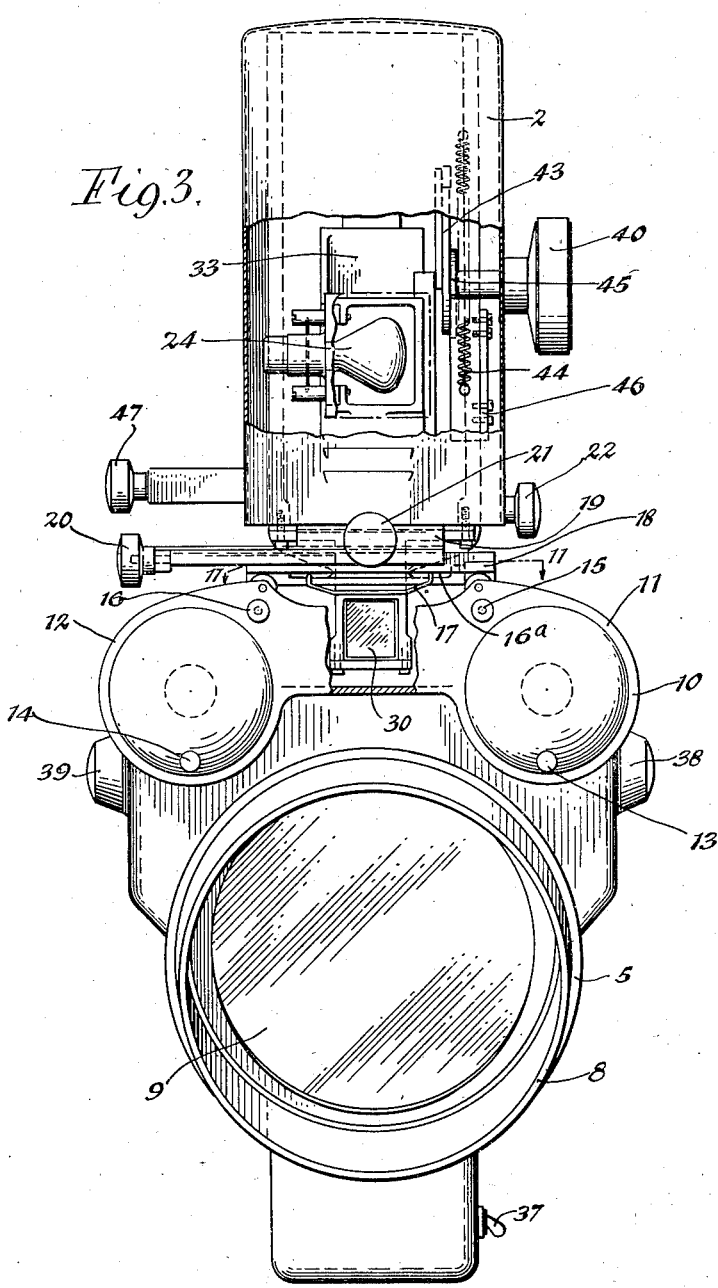

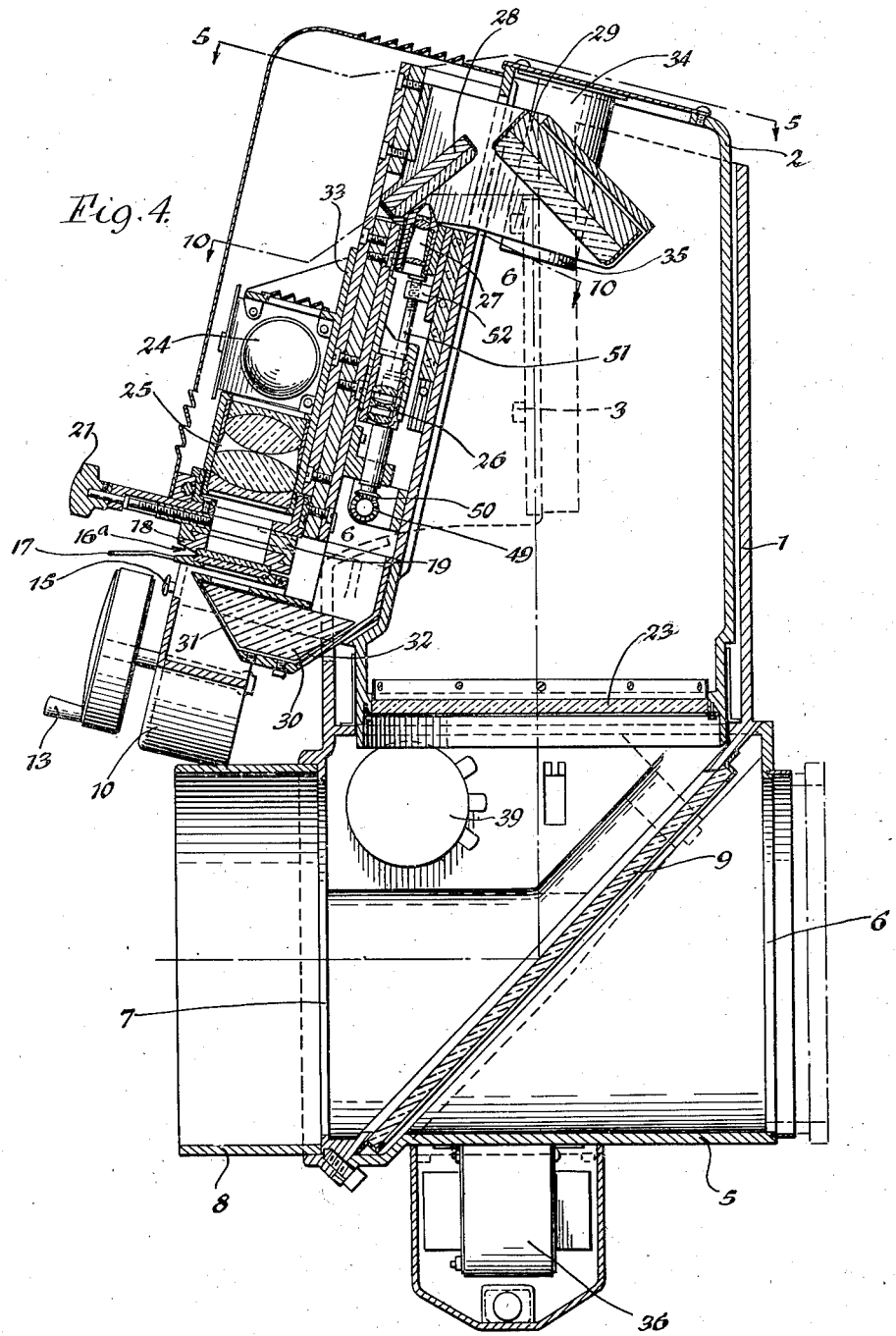

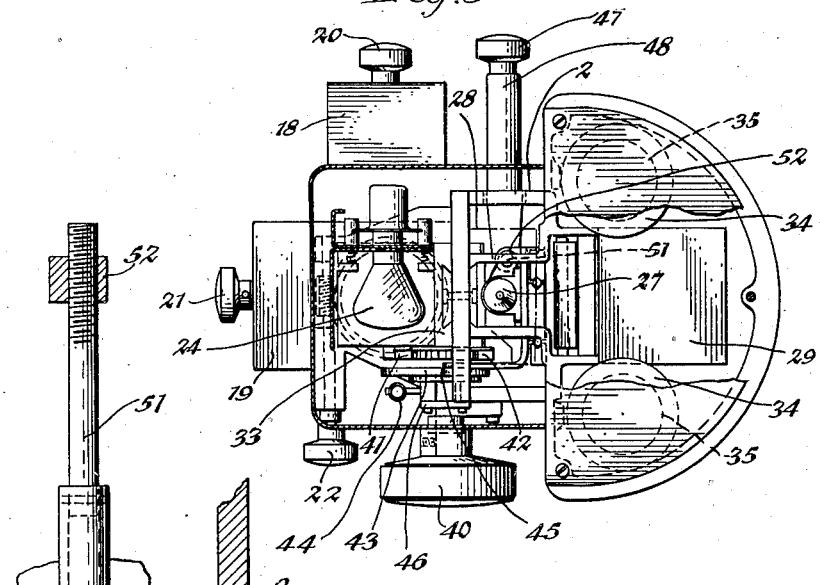
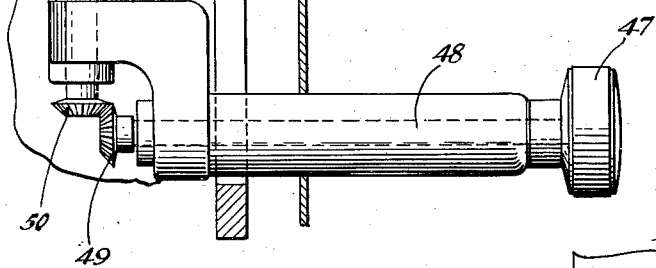
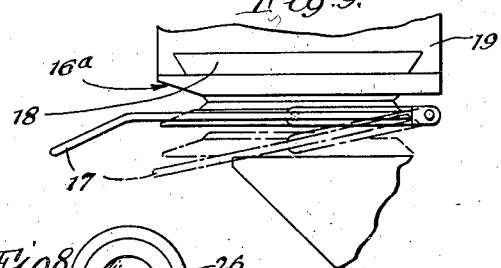
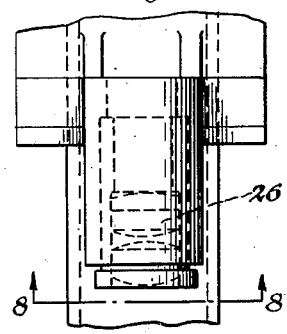
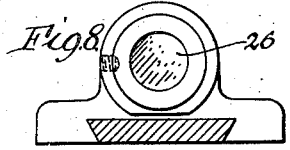

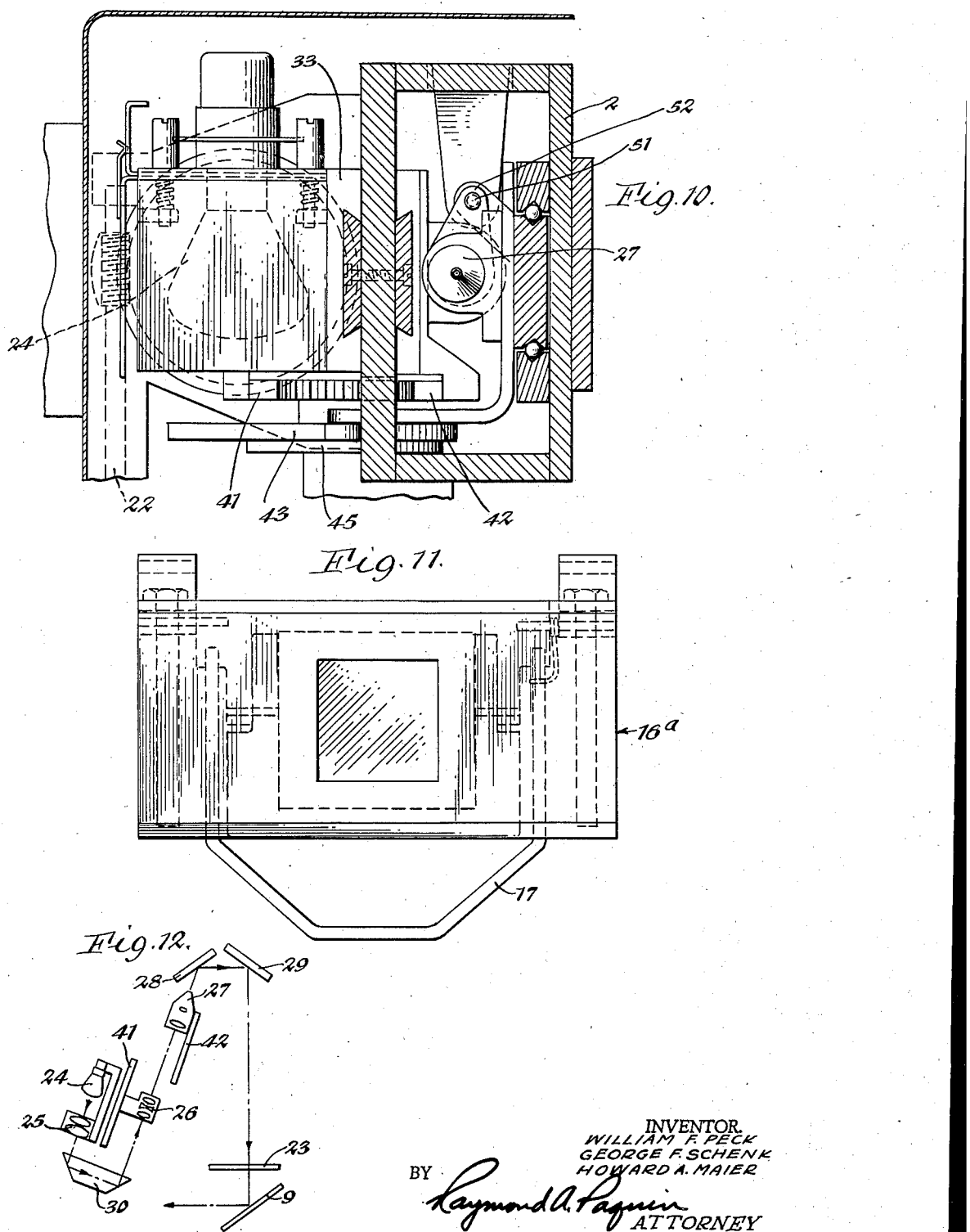

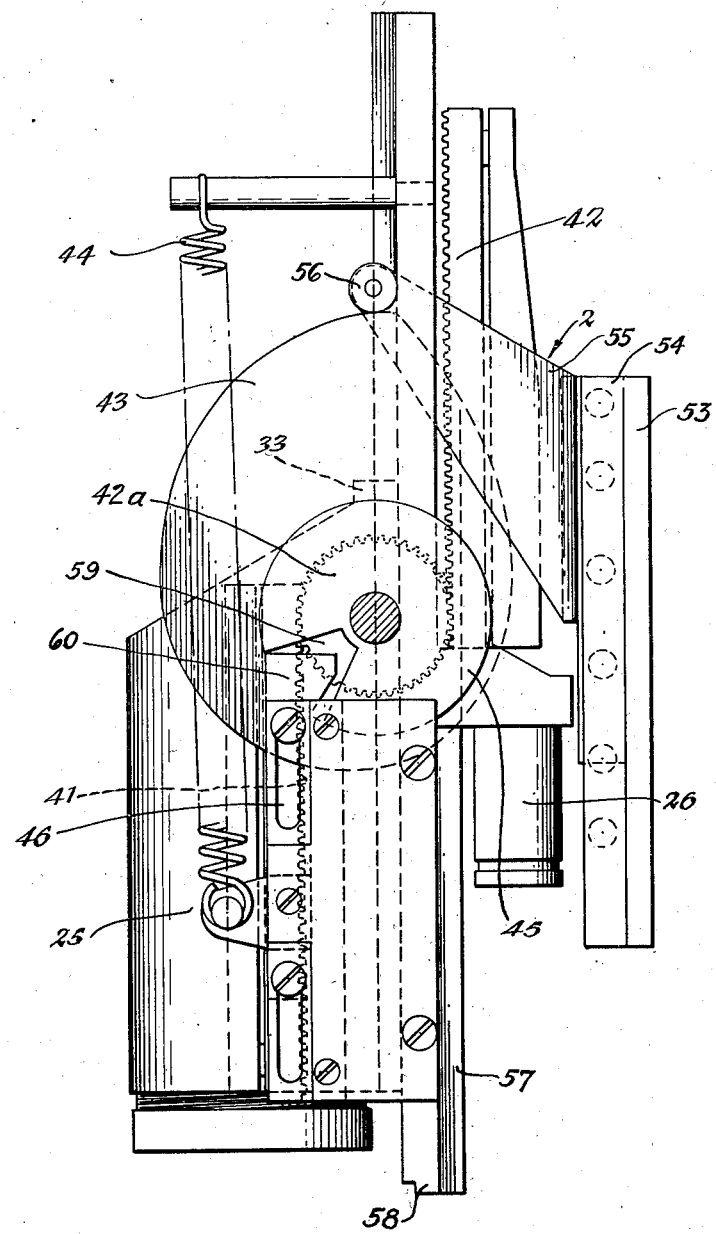

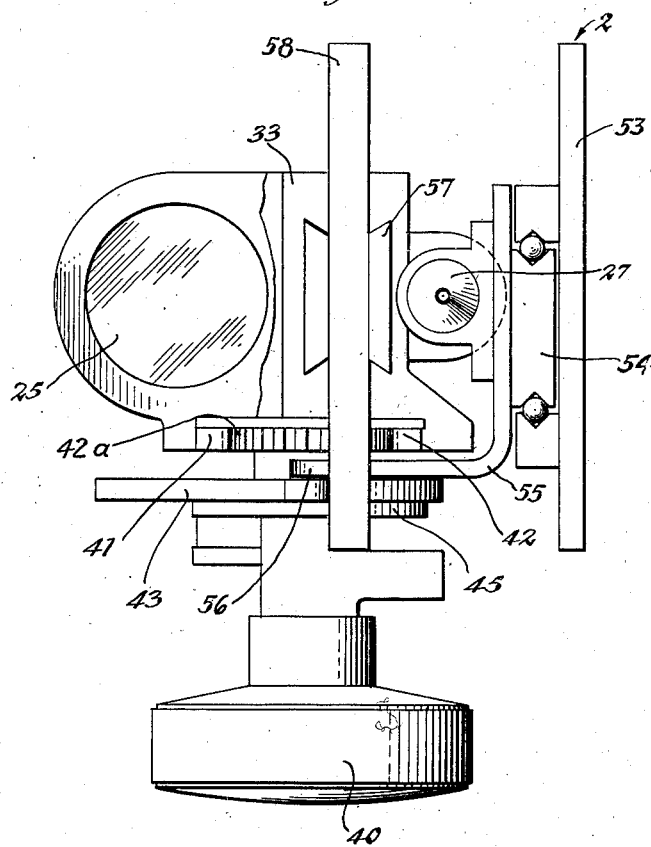

2,415,305

UNITED STATES PATENT OFFICE 2,415,305

PROJECTION APPARATUS

William F. Peck, George F. Schenk, and Howard A. Maier, Buffalo, N. Y., assignors, by mesne assignments, to American Optical Company, Southbridge, Mass., a voluntary association Application May 12, 1944, Serial No. 535,306

19 Claims. (Cl. 88—24)

This invention relates to the provision of a relatively small and compact but highly efficient projection apparatus and more particularly to a new and improved projection apparatus of this type having a variable magnification arrangement.

An object of the invention is to provide a projection apparatus having new and improved means for varying at will the size or magnification of the projected image.

Another object of the invention is to provide a projection apparatus of the type set forth which allows projection at variable magnification with a fixed screen and a fixed object plane.

Another object of the invention is to provide a new and improved means for adjusting the film slide of a projection apparatus to adjust the position of the image on the screen.

Another object of the invention is to provide a relatively small, compact but highly efficient projection apparatus.

Another object of the invention is to provide a new and improved arrangement for securing the film mechanism of a film slide projector to the projection apparatus whereby the film holder unit may be easily and quickly attached to or detached from the projector.

Other objects and advantages of the invention will be apparent from the following description taken in connection with the accompanying drawings. It will be understood that many changes may be made in the details of construction and arrangement of parts shown and described without departing from the spirit of the invention as expressed in the accompanying claims. We, therefore, do not wish to be limited to the exact details of construction and arrangement of parts shown and described as the preferred form has been given by way of illustration only.

Referring to the drawings:

Fig. 1 is a side view of a projection apparatus embodying the invention;

Fig. 2 is a rear view thereof;

Fig. 3 is a front view thereof partially in section;

Fig. 4 is a sectional view taken on line 4—4 of Fig. 2 looking in the direction of the arrows;

Fig. 5 is a sectional view taken on line 5—5 of Fig. 4 looking in the direction of the arrows;

Fig. 6 is a sectional view on an enlarged scale showing the fine adjusting mechanism;

Fig. 7 is a fragmentary view showing the objective lens assembly;

Fig. 8 is a view taken on line 8—8 of Fig. 7 looking in the direction of the arrows;

Fig. 9 is a side view showing the film gate mechanism;

Fig. 10 is a sectional view taken on line 10—10 of Fig. 4 looking in the direction of the arrows;

Fig. 11 is a sectional view taken on line 11—11 of Fig. 3 looking in the direction of the arrows;

Fig. 12 is a diagrammatic view illustrating the optical system of the projection apparatus;

Fig. 13 is a partial side view of the projection apparatus similar to Fig. 1 but on an enlarged scale and with the cover removed; and Fig. 14 is an end or top view of the arrangement shown in Fig. 13.

The projection apparatus comprises briefly an object support and projection screen in fixed planes with a projection system interposed therebetween and including a light source, condensing lens system, objective lens system and projection eyepiece lens system together with reflectors for directing the projected image onto the projection screen with means for adjusting certain elements of said optical system relative to other elements of said system whereby the size of the projected image may be easily and quickly varied at will without disturbing the planes of said object support and projection screen.

The apparatus shown embodying the invention comprises a mounting bracket 1 to which is secured the projection unit 2 by means of the bolts or the like 3.

The projection unit 2 is partially surrounded by the side portions of the mounting bracket 1 and the bolts 3 extend through slots 4 which allow vertical adjustment of the projection unit 2 relative to the mounting bracket 1 after which the unit 2 may be secured in adjusted position by tightening the bolts or the like 3.

The mounting bracket 1 has the lower housing portion 5 which has the aligned openings 6 and 7 adjacent the opposite ends thereof as hereinafter described. Surrounding the observation opening 7 is the shield or hood member 8 to prevent the entrance of stray light into the interior of the housing 5. Within the housing 5 is provided the partial reflector 9 as also hereinafter described.

As shown in Fig. 4, the lower end of the projection unit housing 2 is closely fitted into an opening in the upper side of the housing 5.

Secured to the lower end of the projection unit 2 is positioned the film magazine 10 adapted to contain the film to be projected, which film magazine comprises the film containing members 11 and 12 each containing a film spool which spools are adapted to be wound and unwound by means of the handle members 13 and 14 respectively. To secure the film magazine 10 to the projection unit the retaining screws or bolts 15 and 16 are provided. These retaining screws 15 and 16 extend through openings in the film magazine 10 and nuts are threadedly connected to each of said bolts 15 and 16 to retain the film magazine on the projection unit and allow the ready removal of the film magazine from the projection unit and facilitates the attachment of said film magazine to said projection unit.

Between the film spools 11 and 12 as previously described there is provided the film gate 16a having the handle or arm 17 which may be manually operated to open the film gate during movement of the film to prevent damage or injury to the film.

The film gate mechanism 16a is adjustable relative to the optical system of the projection apparatus by means of the cross slides 18 and 19 which are actuated by means of the screws 20 and 21 respectively and the film gate 16a may be rotated relative to the axis of the projection apparatus by means of the tangent screw 22. By means of these cross slides and tangent screw means for rotating the film gate the projected image may be adjusted to desired position on the screen 23 where it may be viewed by means of the partial reflector 9 which is so positioned relative to the screen 23 as to allow viewing of an image thereof on the reflector 9 through the opening 7.

The optical system of the apparatus comprises the projection lamp 24, condenser unit 25 containing condensing lenses, objective lens system 26, projection eyepiece or ocular lens system 27 and reflectors 28 and 29 which members are all in optical alignment. In optical alignment with the film gate 16 and the objective lens system 26 is the double reflecting prism member 30 having the reflecting face 31 optically aligned with the film gate and adapted to reflect the image to be projected to the reflecting face 32 optically aligned with the projection objective.

Over the end of the projection eyepiece system is placed a telecentric stop as shown in Figs. 5 and 14.

The projection lamp 24 and condenser lens unit 25 are mounted on the slide 33 for simultaneous adjustment as a unit during the variation of the ratio of magnification of the projection system.

For illumination of a scale on the upper surface of the screen 23 there is provided a pair of lamps similar to the projection lamp 24 which lamp is positioned within the housing 34 over the lower end of which is the color filter 35 of red or other suitable color. Secured to the lower surface of the body portion 5 of the mounting bracket 1 is the transformer 36 controlled by the switch 37. Over the transformer 36 may be placed a protective housing or covering as shown. The projection lamps 24 and the lamp within the housings 34 are individually controlled by means of the rheostats 38 and 39 respectively. The switch 38 operates to control both of the lamps as a unit.

The variable magnification arrangement or means for varying the size of the projected image is controlled by means of the knob or hand wheel 40. Rotation of this knob 40 causes movement of the racks 41 and 42 by means of the pinion 42a, and also causes rotation of the cam 43. A counterbalancing arrangement comprising the spring 44, cam 45 having a slot 59 engaged by the portion 60 on the slide 41 is provided to counteract the torque produced by the sharp rise on one end of the cam 43. The slide 41 is retained in position by the screws extending through the slots 46.

The objective 26 is adjustably mounted on the gib 57 on the frame 58 and is adapted to be adjusted on said frame by means of the rack and pinion mechanism previously described.

Adjustment of the knob 40 and cam 43 causes movement of the projection lamp 24 and condenser lens system 25 as a unit in a direction opposite to the direction of movement of the objective lens system 26 and part of the movement of the projection eyepiece system 27. It is pointed out that the projection eyepiece 27 will move in a direction similar to the direction of movement of the objective 26 until the mid point of the excursion of the objective is reached at which time the projection eyepiece 27 reverses its direction of movement and moves in the opposite direction until it reaches its original position. At this point the limit of variation of the magnification has been reached.

For effecting movement or adjustment of the projection eyepiece or ocular 27 there is provided the frame 53 on which is slideably mounted the eyepiece slide 54 carrying the eyepiece 27 and the slide 54 is provided with the portion 55 having the cam follower or roller 56 adapted to engage the surface of the cam 43 and be adjusted through adjustment of said cam to raise or lower the eyepiece or ocular 27 to vary the magnification or size of the projected image on the screen.

To assist in bringing the projected image into focus at some extreme ranges a fine focusing mechanism as shown in detail in Fig. 6 is provided. This fine focusing mechanism comprises the knob 47 on the shaft 48 which actuates the beveled gears 49 and 50 which in turn actuates the spline adjustable shaft 51 which is threadedly connected to the member 52 on the eyepiece slide and thereby causes very fine movement or adjustment of the projection eyepiece to focus the projected image.

In Fig. 12 is shown a diagrammatic view illustrating the principles of the optical system.

It is pointed out that the light source and objective are moved by the rack and pinion mechanism, as previously described, simultaneously at the same rate and that they move in opposite directions mechanically but in the same direction optically. The optical distance from the condenser to the objective is fixed and remains fixed. The movement of the eyepiece is controlled by the cam and the eyepiece moves at a differential rate than the objective, that is, the cam and cam follower control the movement of the eyepiece with the ratio of such movement controlled by the optical arrangement.

It is pointed out that the mechanism of the eyepiece must be such as to produce a final image on the screen whose size shall be within the desired magnification range.

To get a compact system the eyepiece is used at the full field angle of which it is capable.

For the most compact system the objective should work in such a manner that the extreme primary magnifications are such that one magnification is the negative of the square root of the ratio of extreme overall magnifications and the other extreme primary magnification is the reciprocal of this ratio.

It is further pointed out that the condenser images the filament of the lamp approximately at the first focal point of the objective so that the chief rays between the objective and the eyepiece are substantially parallel to the optical axis so that the entrance pupil for the eyepiece is effectively at infinity and the characteristics of the eyepiece as regards distortion do not materially change throughout the motion of the eyepiece.

In the use of the projection apparatus the film to be projected is positioned in the film magazine 10 and by turning the knobs 13 and 14 the desired portion of the film is brought into the film gate in optical alignment with the projection system. Light from the lamp 24 passes through the condenser lenses in the condenser unit 25 then through the film in the film gate 16 and is reflected by the reflecting surface 31 of the prism 30 to the reflecting surface 32 of said prism which in turn reflects said image through the projection objective 26 and through the projection eyepiece 27 where it strikes the reflector or mirror 28 which in turn reflects said image to the mirror or reflector 29 by which it is reflected onto the translucent screen 23.

By adjustment of the knob 40 the optical system is adjusted as previously described and the projected image 16 may be varied in magnification or size until the desired magnification is reached, that is, the projected image on the translucent screen 23 is of desired size and then this projected image may be viewed through the opening 7 and the partial reflector 9.

Where it is desired to align the projected image or parts of the projected image with other material, the material to be aligned therewith is placed in alignment with the opening 6 and the projected image on the screen 23 and the material to be aligned therewith are viewed in superimposed relation through the opening 7.

From the foregoing it will be seen that we have provided simple, efficient and economical means for obtaining all of the objects and advantages of the invention.

Having described our invention, we claim:

1. Projection apparatus comprising a source of illumination having a condensing lens system, a focusable optical projection system, and a projection screen in optically aligned relation, said condensing lens system focusing at the first focal point of said projection system, means for supporting material to be projected in alignment with the optical path of said projection system, said source of illumination and said projection system being mounted for adjusting movement longitudinally of said optical path while said screen and said material remain stationary, adjusting mechanism for simultaneously moving said projection system relative to said stationary material and maintaining the image of said material focused on said screen whereby the size of said image may be varied, and actuating means connected to said adjusting mechanism for maintaining constant the optical spacing of said source of illumination and said optical projection system during movement of the latter relative to said material.

2. Projection apparatus comprising a source of illumination having a condensing lens system, an optical projection system and a projection screen in optically aligned relation, said condensing lens system focusing at the first focal point of said projection system, means for supporting material to be projected in alignment with the optical path of said projection system, said optical projection system having optical elements mounted for adjusting movement relative to each other and longitudinally of said optical path while said screen and said material remain stationary, adjusting mechanism for moving said elements longitudinally of said optical path while maintaining the image of said stationary material focused on said screen whereby the size of said image may be varied, and actuating means connected to said adjusted mechanism for maintaining constant the optical spacing of said source of illumination and said optical projection system during movement of the latter relative to said material.

3. Projection apparatus comprising a gate for supporting film or the like to be projected, an optical projection system cooperating therewith to project an image of the material supported by said gate, a projection screen optically aligned with said projection system to receive said image, a source of illumination for transmitting light through said gate to said projection system and having a condensing lens system focusing at the first focal point of said projection system, said optical projection system having optical elements mounted for adjusting movement relative to each other and longitudinally of said optical path while said screen remains stationary, adjusting mechanism for moving said elements longitudinally of said optical path relative to said gate while maintaining the image of said material focused on said screen whereby the size of said image may be varied, and actuating means connected to said adjusting mechanism for moving said illuminating means relative to said gate to maintain constant the optical spacing of said source of illumination and said optical projection system during movement of the latter relative to said gate.

4. Projection apparatus comprising a source of illumination having a condensing lens system, a focusable optical projection system and a projection screen in optically aligned relation, said condensing lens system focusing at the first focal point of said projection system, a gate for supporting film or the like to be projected by said system in optical alignment therewith, said source of illumination and said projection system being mounted for adjusting movement longitudinally of said optical path relative to said screen and said gate, adjusting mechanism for simultaneously moving said projection system relative to said gate and maintaining the image of the material supported by said gate focused on said screen whereby the size of said image may be varied, actuating means connected to said adjusting mechanism for maintaining constant the optical spacing of said source of illumination and said optical projection system during movement of the latter relative to said material, a housing adjacent said screen, said housing having oppositely disposed openings and a partial reflector in said housing inclined relative to said screen and positioned between said openings whereby the projected image on said screen may be viewed in said partial reflector.

5. Projection apparatus comprising a source of illumination having a condensing lens system, an optical projection system, and a projection screen in optically aligned relation, said condensing lens system focusing at the first focal point of said projection system, means for supporting material to be projected in alignment with the optical path of said projection system, said optical projection system comprising an objective and a projection eyepiece mounted for adjusting movement relative to each other and longitudinally of said optical path while said screen remains stationary, the optical axis of said projection system being substantially parallel to and offset from the optical axis of said source of illumination, means for reversing the path of the light from said source of illumination and for directing said light to said projection system, adjusting mechanism for moving said objective and eyepiece longitudinally of said optical path while maintaining the image of said material focused on said screen whereby the size of said image may be varied, and means actuated in common with said adjusting mechanism for maintaining constant the optical spacing of said source of illumination and said optical projection system during movement of the latter relative to said material.

6. In a device of the character described, a source of illumination, a projection lens system and a projection screen in optical alignment, a gate for receiving a transparency to be projected by said lens system onto said projection screen, means for adjusting said gate in the plane of said transparency including cross slides for effecting translation of said gate and a turn table for effecting rotation of said gate, said cross slides and turn table cooperating to position the projected image in desired position on said projection screen without varying the optical spacing of the transparency from said projection lens system.

7. In a device of the character described, a source of illumination with its axis directed in one direction, a projection optical system having its optical axis offset from and substantially parallel with the first mentioned axis and arranged to project an image in the opposite direction from said first mentioned direction, means for directing light from said light source to said projection optical system, said projection optical system comprising an objective and a projection ocular, means comprising a rack for adjusting said objective, means comprising a rack for adjusting said source of illumination, a pinion engaging both said racks, a cam rotatable with said pinion, and means engaging said cam and adapted to be adjusted thereby to vary the position of said projection ocular whereby the size of the projected image may be varied without altering the location of the material to be projected and without altering the optical spacing of said source of illumination from said objective.

8. In a device of the character described, a source of illumination, a film gate in alignment with said source of illumination, the optical axis of said source of illumination and said film gate being in a substantially vertical direction, a projection lens system spaced from and having its optical axis substantially parallel with the optical axis of said source of illumination and film gate, means for directing light passing through said film gate from said source of illumination to said optical system, a horizontally disposed projection screen having its axis spaced from the optical axis of said optical system, means for directing the projected image from said lens system to said projection screen, said means comprising a pair of reflectors with the first reflector being aligned with said optical system and the second reflector being aligned with the projection screen, means for adjusting various portions of said optical system relative to other portions of said system to vary the size of the projected image on said screen without varying the position of said film gate or said projection screen, a housing adjacent said projection screen and a reflector in said housing inclined relative to said screen for facilitating the viewing of the projected image.

9. Projection apparatus comprising a source of illumination an optical projection system and a projection screen in optically aligned relation, means for supporting material to be projected in alignment with the optical path thereof, said optical projection system comprising an objective and a projection eyepiece, said source of illumination and objective and projection eyepiece being mounted for adjusting movement longitudinally of said optical path, and adjusting mechanism for moving said source of illumination and said objective at the same rate and optically in the same direction while moving the projection eyepiece at a different rate to vary the size of the projected image on said screen without altering the location of the screen and material to be projected and without altering the optical spacing of said source of illumination and said objective.

10. Projection apparatus comprising a projection screen and an optical projection system including an objective in optically aligned relation therewith, a source of illumination with its optical axis offset from and parallel to the axis of said objective, reflecting means for maintaining said source of illumination and said objective in optically aligned relation, means for supporting material to be projected in optical alignment with said source of illumination and optical projection system, and means for simultaneously adjusting said source of illumination and said optical projection system relative to the material to be projected to vary the size of the projected image on said screen without altering the position of the projection screen and material to be projected and while maintaining the projected image focused on said projection screen, said adjusting means comprising a rotatable actuating member having a portion thereof operatively connected to said source of illumination and another portion thereof operatively connected to said objective, said portions being on opposite sides of the axis of rotation of said member and equidistant therefrom to bring about adjustment of said source and said objective at the same rate and in opposite directions for maintaining their optical spacing constant.

11. Projection apparatus comprising a source of illumination, an optical projection system, means for supporting material to be projected and a projection screen in optically aligned relation, said optical projection system comprising an objective and a projection eyepiece, the axis of said source of illumination being offset from and substantially parallel with the optical axis of said optical projection system, and adjusting mechanism for simultaneously adjusting said source of illumination, said objective, and said projection eyepiece relative to said projection screen and to the material to be projected to vary the size of the projected image on said screen without altering the position of the projection screen and material to be projected, said mechanism including a common actuating member for said source of illumination and for said objective for maintaining the optical spacing thereof constant, and a cam for moving said projection eyepiece at a different rate from the movement of said objective to maintain the projected image focused on said projection screen.

12. Projection apparatus comprising a source of illumination, an optical projection system, means for positioning material to be projected and a projection screen in optically aligned relation, said optical projection system comprising an objective and a projection eyepiece, and mechanism for simultaneously adjusting said objective and said projection eyepiece relative to the material to be projected and to said projection screen to vary the size of the projected image on said screen without altering the location of the projection screen and material to be projected comprising an actuator for moving the objective along the axis of said optical projection system and another actuator for causing the projection eyepiece to move during part of the travel of the objective in the same direction therewith and at a different rate, and during another part of the travel thereof in the opposite direction.

13. Projection apparatus comprising a housing, a projection screen adjacent the viewing end of the housing, a source of illumination carried by said housing with its axis directed toward said end of the housing, a projection optical system disposed in said housing in offset relation with said source of illumination and having its optical axis substantially parallel with the axis of said source of ilumination and arranged to pass light from said source in the opposite direction, means optically aligned with said source of illumination and with said projection system for positioning material to be projected, said system comprising an objective for receiving light from said source and a projection eyepiece directed away from said screen for focusing an image of said material on said screen, means for directing light from said source of illumination to said objective, and means for directing the projected image from said projection eyepiece to said projection screen to form a relatively compact and portable projection apparatus.

14. Projection apparatus comprising a housing, a projection screen adjacent the viewing end of the housing, a source of illumination carried by said housing with its axis directed toward said end of the housing, guides mounted on the housing for adjustably carrying a projection optical system in offset relation with said source of illumination and with its optical axis substantially parallel with the axis of said source of illumination, a gate optically aligned with said source of illumination and with said projection system, said system comprising an objective for receiving light from said source and a projection eyepiece directed away from said screen for focusing an image on said screen, adjusting mechanism for moving the objective and the projection eyepiece along the axis of said system at different rates for varying the size of the projected image on said screen without altering the location of the screen and gate, means for directing light from said source of illumination to said objective, and means for directing the projected image from said projection eyepiece to said projection screen.

15. Projection apparatus including a projection screen, an optical projection system for focusing an image on said screen having a housing, and a source of illumination for said projection system comprising a lamp and a condenser lens system, said projection system comprising an objective lens system and a projection ocular, said source of illumination and said objective lens system being mounted back to back on slides on said housing, common adjusting means for moving said source of illumination and said objective lens system at the same rate in opposite directions to maintain the optical spacing between said source of illumination and said objective lens system constant, and compensating means for moving said projection ocular at a different rate from said objective lens system to maintain said image in focus on said screen while varying its size.

16. Projection apparatus comprising a projection screen, an optical projection system for focusing an image on said screen, a gate, and a source of illumination for said projection system, said projection system comprising an objective lens system, a projection ocular and adjusting mechanism for varying the size of the projected image on said screen without altering the position of the projection screen and the gate and while maintaining the projected image focused on said screen, said adjusting mechanism including actuators for moving the objective lens system and the projection ocular along the axis thereof at different rates and an independent fine adjustment for actuating said projection ocular to obtain a more accurate spacing of said projection ocular from said objective lens system when required to bring said image into focus.

17. Projection apparatus comprising a housing, a projection screen adjacent the viewing end of the housing, a projection optical system carried by the housing and arranged to project an image away from the viewing end of the housing, said system comprising an objective and a projection eyepiece directed away from said screen, means for directing the projected image from said projection eyepiece to said projection screen including a reflector aligned with said projection eyepiece and a second reflector in optical alignment therewith and with said screen, a source of illumination carried by said housing with its axis directed toward the viewing end of the housing, a double reflecting prism for directing light from said source of illumination to said objective and a gate overlying said prism in alignment with the axis of said source of illumination, the light from said source of illumination passing to said screen along three substantially parallel paths to afford a relatively compact arrangement of said projection apparatus.

18. In projection apparatus having a projection screen, an optical projection system including an objective and a projection ocular for focusing an image on said screen and a source of illumination for said projection system, the combination of adjusting mechanism with said objective and said projection ocular for varying the size of the projected image on the screen while maintaining the projected image focused on said screen, said adjusting mechanism comprising a rotatable actuator for axially moving the objective at one rate, a cam rotatable with said actuator for axially moving the projection ocular at a different rate, said projection ocular being biased in one direction, and opposed biasing means for said cam adapted to overcome the tendency of the projection ocular when the steeper cam surfaces are operative to cause accidental motion of said adjusting mechanism.

19. In projection apparatus having a projection screen, a vertically arranged optical projection system including an objective and a projection ocular for focusing an image on said screen and a source of illumination for said projection system, the combination of adjusting mechanism with said objective and said projection ocular for varying the size of the projected image on the screen while maintaining the projected image focused on said screen, said adjusting mechanism comprising a rack and pinion for raising the objective at one rate, a cam rotatable with said pinion for raising the projection ocular at a different rate, and a spring biasing said cam in a direction to raise the projection ocular and overcome the tendency of the weight thereof to reverse the direction of rotation of said pinion.

WILLIAM F. PECK.
    GEORGE F. SCHENK.
    HOWARD A. MAIER.

REFERENCES CITED

The following references are of record in the file of this patent:

UNITED STATES PATENTS

| Number | Name | Date |
|---|---|---|
| 2,204,709 | Straubel et al. | June 18, 1940 |
| 2,042,815 | White | June 2, 1936 |
| 1,174,547 | Clason | Mar. 7, 1916 |
| 2,008,982 | Hopkins | July 23, 1935 |
| 1,589,349 | Bausch et al. | June 22, 1936 |
| 2,327,289 | Reason | Aug. 17, 1943 |
| 1,784,046 | Craig | Dec. 9, 1930 |
| 1,821,626 | Fleischer | Sept. 1, 1931 |
| 2,336,508 | Smith et al. | Dec. 14, 1943 |
| 1,977,475 | Feybusch | Oct. 16, 1934 |
| 2,313,204 | Morelle | Mar. 9, 1943 |